(12) United States Patent
Funk et al.

(10) Patent No.: US 7,328,045 B2
(45) Date of Patent: Feb. 5, 2008

(54) SECURE AND INTUITIVE METHOD FOR WIRELESS NETWORK SET-UP AND ASSOCIATED DEVICE AND SYSTEM

(75) Inventors: Karsten Funk, Mountain View, CA (US); Arne Dietrich, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 339 days.

(21) Appl. No.: 10/745,850

(22) Filed: Dec. 24, 2003

(65) Prior Publication Data
US 2005/0143129 A1 Jun. 30, 2005

(51) Int. Cl.
*H04M 1/00* (2006.01)
*H04N 7/18* (2006.01)
*G08C 19/22* (2006.01)

(52) U.S. Cl. .................. 455/560; 725/78; 341/176
(58) Field of Classification Search .............. 455/419, 455/41, 560; 340/825.72, 825.71; 348/734; 398/121; 701/19; 700/17; 725/40, 46, 78; 341/176; 705/1; 345/835
See application file for complete search history.

(56) References Cited

U.S. PATENT DOCUMENTS

| | | | |
|---|---|---|---|
| 5,410,326 A * | 4/1995 | Goldstein | 348/734 |
| 5,771,438 A | 6/1998 | Palermo et al. | |
| 6,396,612 B1 * | 5/2002 | Bjorndahl | 398/121 |
| 6,424,947 B1 * | 7/2002 | Tsuria et al. | 705/1 |
| 6,748,278 B1 * | 6/2004 | Maymudes | 700/17 |
| 6,759,967 B1 * | 7/2004 | Staller | 340/825.72 |
| 6,812,881 B1 * | 11/2004 | Mullaly et al. | 341/176 |
| 2002/0081974 A1 * | 6/2002 | Eaton et al. | 455/41 |
| 2002/0137460 A1 * | 9/2002 | Sun et al. | 455/41 |
| 2002/0174430 A1 * | 11/2002 | Ellis et al. | 725/46 |
| 2003/0093791 A1 * | 5/2003 | Julia et al. | 725/40 |
| 2003/0103088 A1 * | 6/2003 | Dresti et al. | 345/835 |
| 2003/0106062 A1 * | 6/2003 | Shteyn et al. | 725/78 |
| 2004/0266489 A1 * | 12/2004 | Chipchase et al. | 455/567 |
| 2005/0065673 A1 * | 3/2005 | Horst et al. | 701/19 |

* cited by examiner

*Primary Examiner*—Joseph Feild
*Assistant Examiner*—Kiet Doan
(74) *Attorney, Agent, or Firm*—Kenyon & Kenyon LLP

(57) ABSTRACT

A method for configuring a wireless network includes pointing a first end of a network configuration device at a wireless device and actuating the network configuration device to add the wireless device to the wireless network. The method may include positioning the first end in close proximity to the wireless device. A device is provided for configuring wireless networks that includes a transmitter configured to transmit at least one of an initiation signal and a connection table to a wireless device. The initiation signal is sent by the device to the wireless device to add or delete the wireless device from a network that is being configured. The connection table includes information about each wireless device that has previously been added to the network. A receiver is included in the device that is adapted to receive at least one of the connection table and a unique identifier from the wireless device. A memory is included in the device that is configured to store the connection table and electrically coupled to the transmitter and the receiver. The transmitter includes an infrared transmitter or a radio frequency transmitter and the receiver includes an infrared receiver or a radio frequency receiver. A system is provided that includes a pointing device including a connection table and a plurality of wireless network devices wirelessly couplable with the pointing device and with each other.

2 Claims, 10 Drawing Sheets

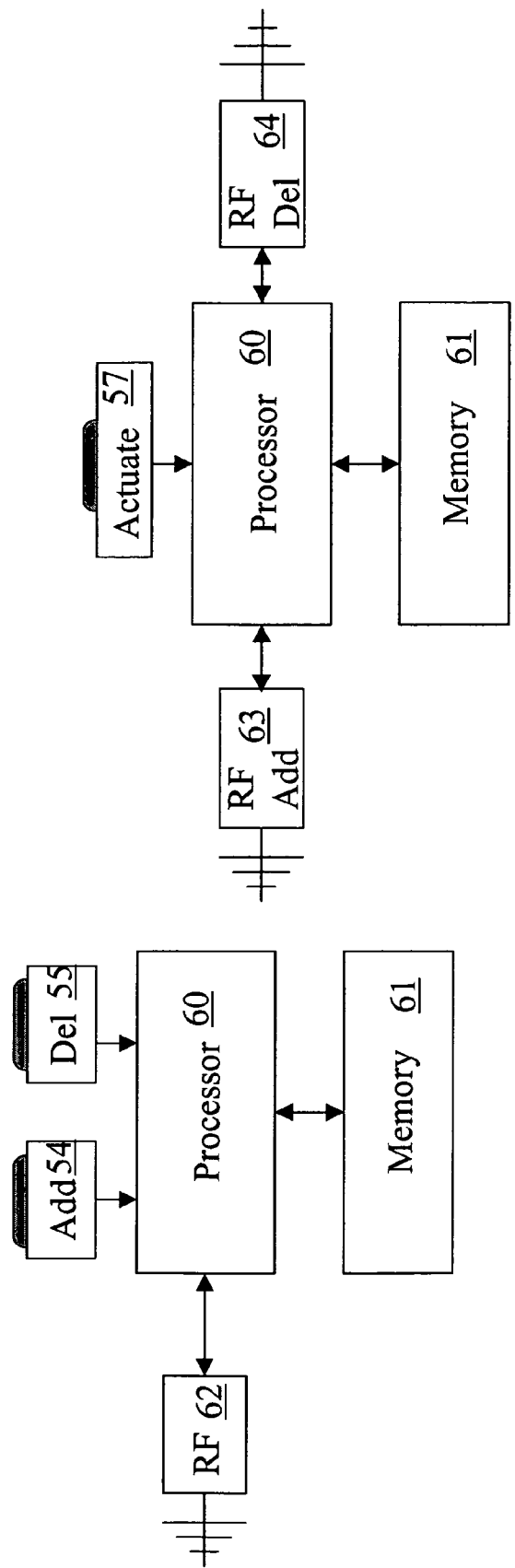

SECURE AND INTUITIVE METHOD FOR WIRELESS NETWORK SET-UP AND ASSOCIATED DEVICE AND SYSTEM

FIELD OF THE INVENTION

The present invention relates to configuring network components. More particularly, the present invention relates to a device and method for setting-up wireless components in a network in a straightforward and intuitive manner.

BACKGROUND INFORMATION

Advances in wireless network technology allows more systems to become network enabled. Exemplary networks include wireless computer networks (e.g., networks based on wireless standards defined in 802.11 a/b/g) to wireless networks in Personal Area Networks (PAN), in which Bluetooth technology may be used. Wireless network technology may replace cables between home stereo and video equipment.

An advantage of wireless networks may be the easy installation of systems throughout a house or apartment (i.e., the ability to include systems from different rooms). One difficulty for a user may be a cumbersome set-up procedure to enable the network components to talk to each other. In wireless computer networks, elaborate knowledge of the properties of the computer's operating system may be necessary to successfully connect multiple computing devices. While a computer may have several possible input/output devices (e.g., keyboard, mouse, display), such a set-up procedure may become more elaborate if a cell phone user wants to pair the cell phone with a wireless headset. Although computer and cell phone users may be characterized as tech-savvy (thereby increasing expectation levels with respect to their ability to navigate complex set-up procedures), this may not be the situation for a home audio-video user.

It may also be desirable for users to be able to clearly and easily define which systems are members of a network. Self-configuring networks may reach systems that should not be part of a network, for instance, a next-door neighbor's wireless device. This situation may cause interference between close-by systems. For instance, a computer user's document may be printed at a neighbor's printer if the neighbor's printer had wireless capability and had accidentally become part of the computer user's self-configuring wireless network. Thus there is a need for a method of setting-up wireless systems that is easy and intuitive.

An easy way to control electronic systems like TVs, VCRs or sound systems is a remote control. This is a well known procedure and there are several technologies known used within remote controls such as infrared, ultrasound and/or radio frequency transmission. One of the lesser-known technologies uses inductive coupling. U.S. Pat. No. 5,771,438 relates to such a short-range magnetic communication system. A system and method discussed therein communicate signals between a portable unit and a communications system using inductive coupling. Multiple, orthogonally arranged transducers may be used in the base unit to provide a more complete magnetic field and to prevent mutual inductance nulls which are otherwise present in a magnetic field. The use of short-range inductive coupling may minimize the power requirements and limit interference with other sources. The inductive coupling may also be used to recharge a battery in the portable device.

SUMMARY OF THE INVENTION

An exemplary method of the present invention provides for configuring a wireless network, and includes pointing a first end of a network configuration device at a wireless device and actuating the network configuration device to add the wireless device to the wireless network. The actuating of the network configuration device may include positioning the first end in close proximity to the wireless device. The actuating of the network configuration device may include pressing a first button of the network configuration device. The method may further include actuating a second button to delete the wireless device from the wireless network. The method may further include pointing a second end of the network configuration device at the wireless device (the second end being opposite the first end) and actuating the first button to delete the wireless device from the wireless network. The method may further include pointing the first end of the network configuration device at a further wireless device and actuating the first button to add the further wireless device to the wireless network. The method may further include pointing the first end of the network configuration device at a further wireless device and actuating the first button to add the further wireless device to the wireless network.

The exemplary method may further include broadcasting by the network configuration device, in response to the actuating of the first button, an initiation signal. The broadcasting of the initiation signal by the network configuration device may be by an infrared transmitter, an ultrasonic transmitter, an inductive transmitter, or a radio frequency transmitter. The method may further include broadcasting by the wireless device, in response to the initiation signal, a unique identifier uniquely identifying the wireless device. The broadcasting of the unique identifier by the wireless device may be by a further infrared transmitter, a further ultrasonic transmitter, a further inductive transmitter, or a further radio frequency transmitter. The method may further include updating by the network configuration device a connection table with the unique identifier of the wireless device and transmitting by the network configuration device the updated connection table to the wireless device.

A device for configuring wireless networks may include a transmitter configured to transmit at least one of an initiation signal and a connection table to a wireless device, a receiver adapted to receive at least one of the connection table and a unique identifier from the wireless device, and a memory configured to store the connection table and electrically coupled to the transmitter and the receiver. The initiation signal may be sent by the device to the wireless device to add or delete the wireless device from a network being configured. The connection table may include information about each wireless device that has previously been added to the network. The transmitter may include an infrared transmitter, an ultrasonic transmitter, an inductive transmitter, or a radio frequency transmitter and the receiver may include an infrared receiver, an ultrasonic receiver, an inductive receiver, or a radio frequency receiver. The device may further include an add button electrically coupled to the transmitter and a delete button electrically coupled to the transmitter.

A system that includes a pointing device that includes a connection table and a plurality of wireless network devices wirelessly couplable with the pointing device. Each of the plurality of wireless devices may be adapted to receive an interrogation signal from the pointing device. Each of the plurality of wireless devices may be adapted to send a unique identifier to the pointing device. Each of the plurality of wireless devices may be adapted to receive a connection table from the pointing device. Each of the plurality of wireless devices may be adapted to send the connection table to each other of the plurality of wireless devices listed in the connection table. Each of the plurality of wireless devices may be adapted to form a network with all the other of the plurality of wireless devices listed in the connection table. The connection table may be encrypted by the pointing device. The pointing device may provide the key to decrypting the connection table to each of the plurality of wireless devices to which the pointing device sends a connection table. The connection table may be decrypted by each of the plurality of wireless devices.

BRIEF DESCRIPTION OF THE DRAWINGS

FIG. 6a shows an exemplary block diagram of a wand with one RF transceiver and an add button and a delete button.

FIG. 6b shows an exemplary block diagram of a wand with forward/backward facing functionality using two RF transceivers and an optional actuation button.

DETAILED DESCRIPTION

Figure 1:
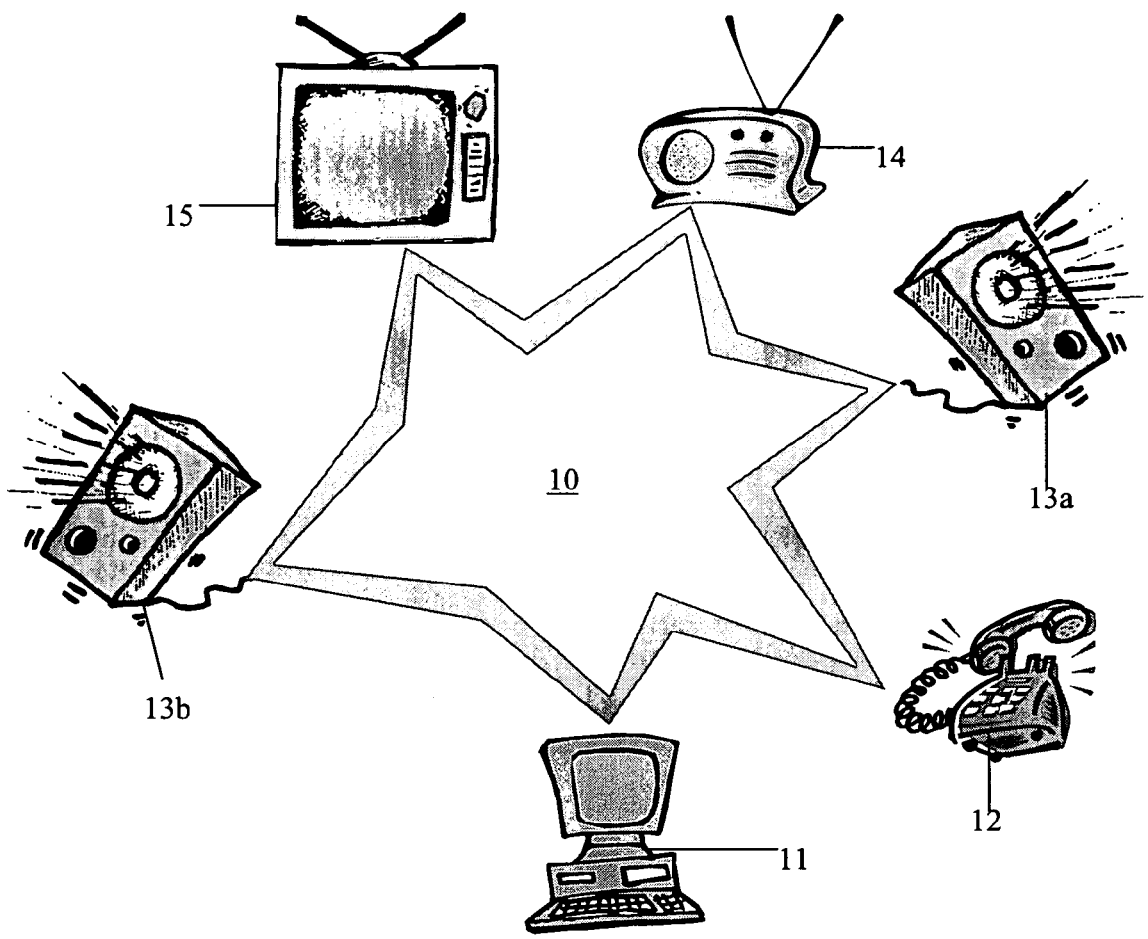
FIG. 1 shows an exemplary home network.

The exemplary embodiments and/or methods of the present invention relate to a method of setting-up network components in a straightforward and intuitive manner. An electronic device (for example, a system remote control) is utilized as a wand and pointed sequentially towards the systems that are to be wirelessly connected. The technique may not require any user interaction other than pointing the wand towards the systems that are to be connected. This action may be analogized to an ordinary introduction between people.

Setting up systems such as components in a wireless network may require a method of interacting with each system in a well-defined and particular way. Each system may need to be uniquely addressable and able to exchange information with an electronic device used to 'bind' the systems into a wireless network. To successfully establish a wireless network, a system profile may be necessary which describes the abilities of each system. These profiles may already be part of ongoing development processes and defined in various standards (for example, Bluetooth Profiles, Home Audio Video Interoperability (HAVi), and Universal Plug and Play (UPnP)). A hard coded unique identifier (UID) may have to be implemented in each system, which, for example, may be a serial number or a combination of model and serial number.

In an exemplary device have forward/backward functionality, a busy button (also referred to herein as an actuation or actuate button) activates both the front and back transceivers. The direction of the device determines whether the action adds or deletes the wireless device. Depressing the actuation button activates both transceivers. The type of action (i.e., add or delete) triggered depends on which transceiver is facing the wireless device.

The connection table may have either a time stamp or a serial number, which is incremented every time the connection table is updated. The most recently dated connection table (for date stamped connection tables) or the highest numbered connection table (for serial numbered connection tables) may have precedence and may overwrite earlier dated or lower numbered connection tables. Each device entering a network (i.e., receiving a connection table) may trigger an update. Each system, upon receipt of an updated connection table including itself, may attempt to contact all the other devices in the table and transmit the updated table to them. Alternatively, each wireless device may only attempt to transmit the updated connection table to certain other wireless devices on the connection table (e.g., the next highest device in the connection table). In this manner, wireless communication traffic may be reduced or minimized. A synchronization may occur after each new system is added.

The wand may keep the connection table with the highest serial number or the latest time stamp. A system may receive the table as part of the initialization process. The updated table may be sent to the system, which subsequently may send the updated table to other members of the network for initialization. To remove a system, the system being removed may receive from the wand an updated connection table that would not include the system. As the last thing this system does as part of the network, the system may send to the remaining members of the network the updated connection table, so that the other members may update their connection tables and remove the selected system. However, if a system is powered down, then it may still be in the table and may be included in the network when it is next powered up within range of another networked device. This may represent an unsuccessful removal of a system from a network. Alternatively, the wand may be directed at a continuing member of the network and may transmit the updated connection table to the device. The device may then synchronize the updated connection table with the other remaining members of the wireless network.

Each serial number or time stamp may have a network ID of some type to distinguish between multiple networks. The wand may include another button in order to toggle between different networks (i.e., different connection tables), and/or a display for showing which connection table (i.e., which network) is currently active. The network ID may be another serial number and may be encrypted.

FIG. 1 illustrates schematically wireless network 10 including computer 11, telephone 12, intercoms 13a and 13b, audio system 14, and TV 15. Additional members of network 10 may include any device including a processor, including a cell phone, a refrigerator, a microwave, a coffeemaker, a printer, a security system, an alarm clock, or any other electronic device.

Figure 2A:
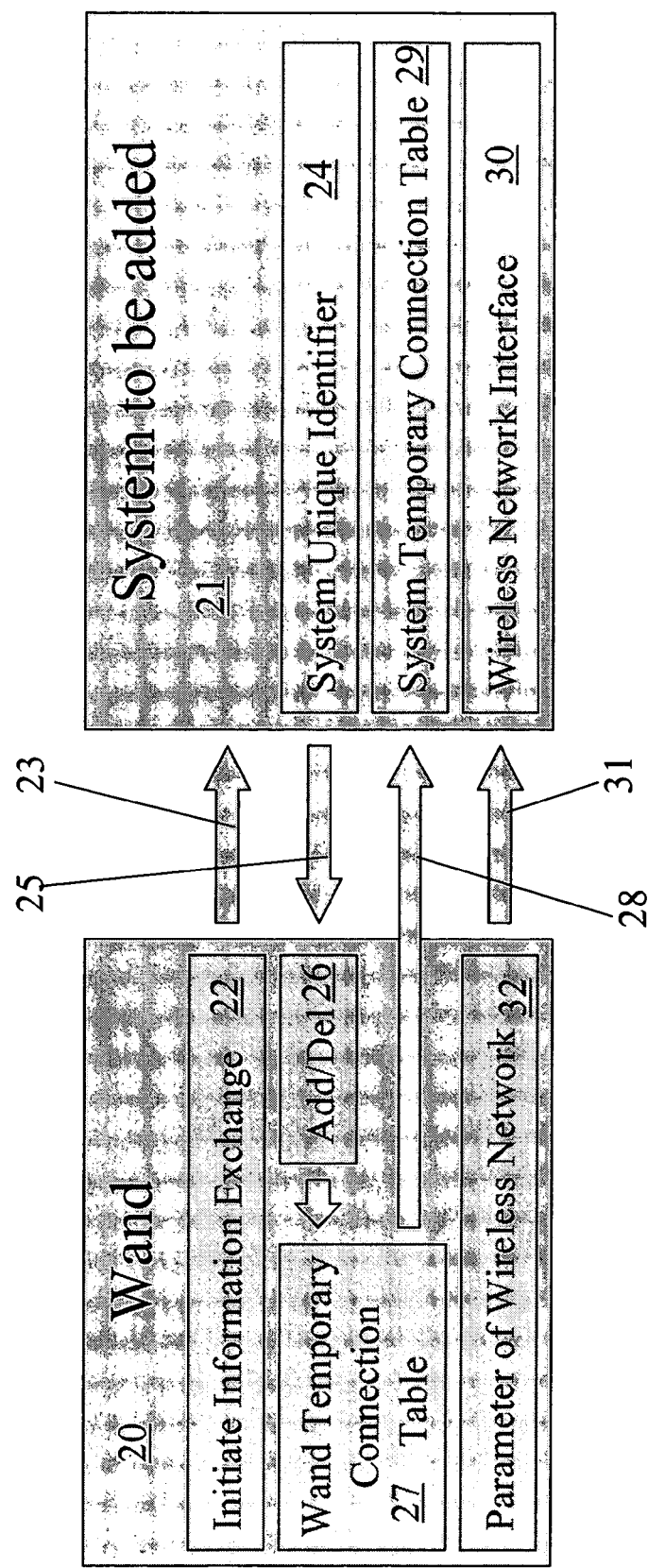
FIG. 2a shows an exemplary interaction between a wand and a wireless system in which the wand changes a temporary connection table and transmits it back to the system.

FIG. 2a illustrates diagrammatically an exemplary interaction between wand 20 and wireless system 21 in which wand 20 changes temporary connection table 27 and transmits it back to system 21. FIG. 2a illustrates an exemplary order of operations starting from the top and proceeding to the bottom. The user of wand 20 may initiate the addition of wireless system 21 to a network by whatever method is provided by wand 20. The initiation may be by pressing a button (which may be an add button or simply a button), or by bringing wand 20 within a close range of system 21. Wand 20 may begin by transmitting initiate information exchange 22 by communication 23. Communication 23 may be by an infrared (IR) signal, a radio frequency (RF) signal, by short-range inductive coupling (magnetic communication), or by any other appropriate method. When system 21 receives communication 23, system 21 may respond by transmitting system unique identifier 24 via communication 25. Communication 25 is received by wand 20 and accesses add/delete function 26. Add/delete function 26 causes system unique identifier 24 to be either added or deleted from wand temporary connection table 27 in wand 20. In this example in which wireless system 21 is to be added to the network, system unique identifier 25 is added to wand temporary connection table 27. If system 21 is to be deleted from the network, system unique identifier 25 is deleted from wand temporary connection table 27. Wand temporary connection table 27 is communicated by communication 28 to system 21 where it becomes system temporary connection table 29.

At some later point in time, whether immediately following communication 28 automatically or by another action of the user, wand 20 communicates the connection parameter of wireless network 32 via communication 31 to system 21. These parameter of the wireless network 32 define the settings of the wireless network interface 30 in system 21.

With respect to the network parameters, the wand may communicate with the wireless device on the same wireless network that the system will use later on. The directional use of the wand, or the wand's selective, directional propagation characteristics may be important for this to work. This may be achieved by lowering the transmission power with respect to a standard wireless device. Alternatively, the wand may communicate with the wireless device using different characteristics from those used later on. The difference may be either a proprietary protocol at the same frequency/modulation scheme, a different frequency and/or modulation scheme, or any other appropriate method. The frequency may be higher or lower, though higher frequencies may improve the directional characteristics of the wand.

Figure 2B:
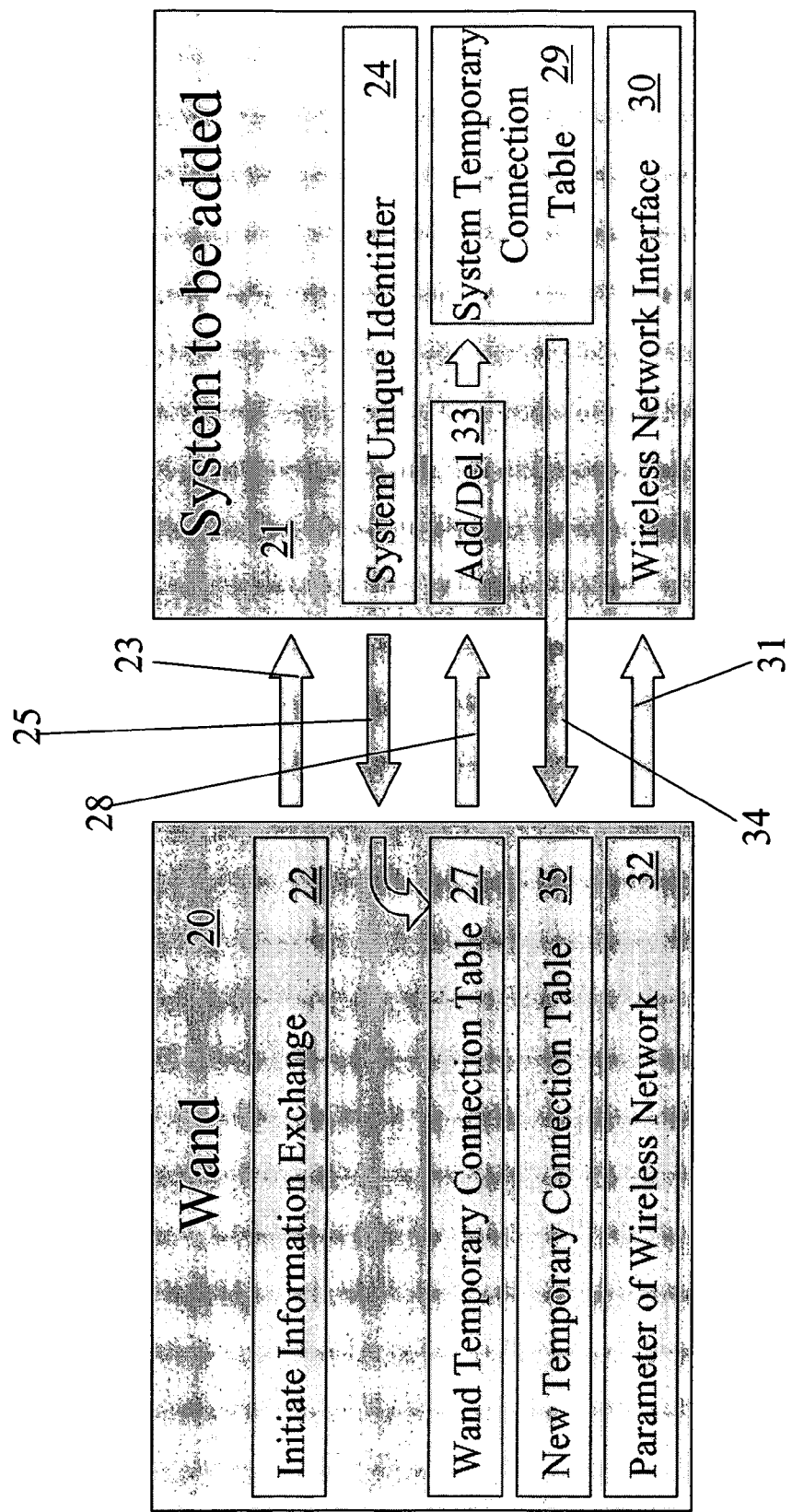
FIG. 2b shows another exemplary interaction between a wand and a wireless system in which the system changes a temporary connection table and transmits it back to the wand.

FIG. 2b illustrates diagrammatically another exemplary interaction between wand 20 and wireless system 21 in which system 21 changes system temporary connection table 29 and transmits it back to wand 20. FIG. 2b illustrates an exemplary order of operations starting from the top and proceeding to the bottom. The user of wand 20 initiates the addition of wireless system 21 to a network by whatever method is provided by wand 20. The initiation may be by pressing a button (which may be an add button, or simply a button) or by bringing wand 20 within a close range of system 21. Wand 20 may transmit initiate information exchange 22 by communication 23. Communication 23 may be by an infrared (IR) signal, a radio frequency (RF) signal, short-range inductive coupling (magnetic communication), or by any other appropriate method. When system 21 receives communication 23, system 21 may respond by transmitting system unique identifier 24 via communication 25. Communication 25 may be received by wand 20, and may cause wand 20 to transmit wand temporary connection table 27 by communication 28 to system 21. System 21 may access add/delete function 33 to create system temporary connection table 29. Add/delete function 33 may cause system unique identifier 24 to be either added or deleted from system temporary connection table 29 in system 21. In this example, in which wireless system 21 is to be added to the network, system unique identifier 25 is added to system temporary connection table 29. If system 21 is to be deleted from the network, system unique identifier 25 is deleted from system temporary connection table 29. System 21 communicates system temporary connection table 29 to wand 20 via communication 34 where it becomes new temporary connection table 35.

At some point later in time, whether immediately following communication 34 automatically or due to another action of the user, wand 20 communicates the connection parameter of wireless network 32 via communication 31 to system 21. These parameter of wireless network 32 define the settings of the wireless network interface 30 in system 21.

In the exemplary embodiment illustrated in FIG. 2b, one more transmission may be necessary compared to the exemplary method of FIG. 2a, but no computations may be necessary in wand 20. Therefore, a FLASH memory or other memory system may be utilized in wand 20, and the use of a processor may be limited to system 21.

Figure 2C:
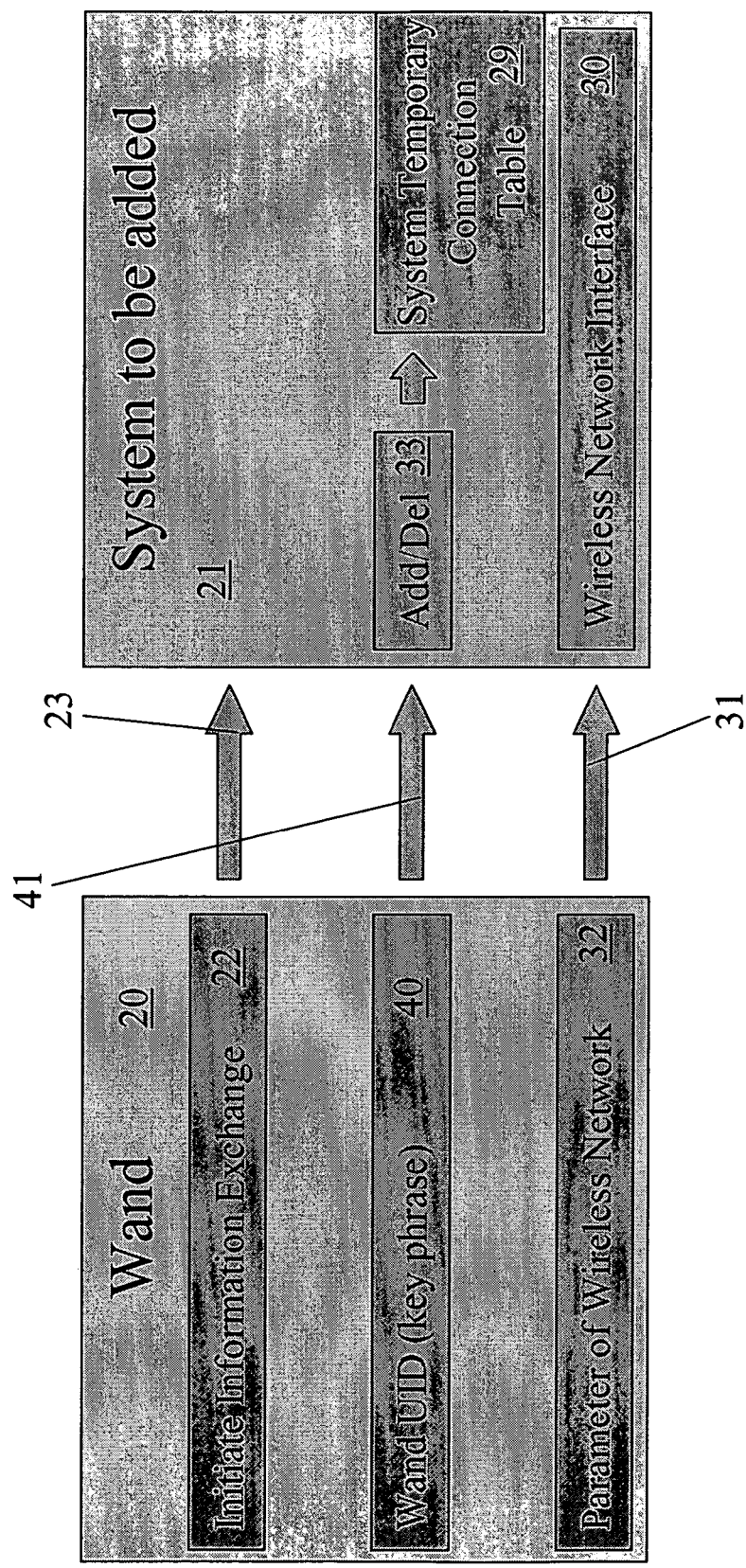
FIG. 2c shows another exemplary interaction between a wand and a wireless system in which the wand communicates an encryption phrase to the system.

FIG. 2c illustrates diagrammatically an exemplary interaction between wand 20 and wireless system 21 in which wand 20 communicates wand UID 40, which may be an encryption phrase, to system 21. FIG. 2c illustrates an exemplary order of operations starting from the top and proceeding to the bottom. The user of wand 20 may initiate the addition of wireless system 21 to a network by whatever method is provided by wand 20. The initiation may be by pressing a button (which may be an add button or simply a button), or by bringing wand 20 within a close range of system 21. Alternatively, a delete button may initiate the exchange. Wand 20 may begin by transmitting initiate information exchange 22 by communication 23. Communication 23 may be by an infrared (IR) signal, a radio frequency (RF) signal, by short-range inductive coupling (magnetic communication), or by any other appropriate method. Communication 23 may also include information from the wand relating to whether the system is being added to the network or deleted from the network. When wireless system 21 receives communication 23, system 21 may prepare to receive an encryption phrase from wand 20. Wand 20 may permanently store wand UID 40 (a unique identifier), which may operate as an encryption phrase. Wand 20 may transmit wand UID 40 in communication 41 to wireless system 21. Wireless system 21 may access add/delete function 33, which may in turn access system temporary connection table 29. Wireless system 21 may use wand UID 40 to decrypt a previously received system temporary connection table 29. Wireless system 21 may then add its own unique identifier to the system temporary connection table 29, and may then use wand UID 40 to encrypt system temporary connection table 29. Then wireless system 21 may transmit the encrypted system temporary connection table 29 to other wireless systems in the vicinity of wireless system 21. The encrypted system temporary connection table 29 may have a date and time stamp to indicate that it is the most recent system temporary connection table 29.

Alternatively, system 21 may store wand UID 40 to decrypt a connection table that is received at a later time. In still another alternative, system 21 may encrypt its own unique identifier using wand UID 40 and may broadcast this encrypted unique identifier to other wireless systems in the vicinity.

At some point later in time, whether immediately following communication 34 or due to another action of the user, wand 20 communicates the connection parameter of wireless network 32 via communication 31 to system 21. These parameter of wireless network 32 define the settings of the wireless network interface 30 in system 21.

During set-up, only the devices receiving this key will be able to communicate with each other and they can maintain system temporary connection table 29 internally and synchronize them altogether during set-up. The exemplary embodiment may avoid the need for any memory in wand 20, and may be appropriate for situations in which wand 20 is only used to set-up one network (which may be the case in many situations in the consumer market). This alternative exemplary embodiment may make the wand simpler by reducing or eliminating the memory or processor requirements for the wand.

Figure 3:
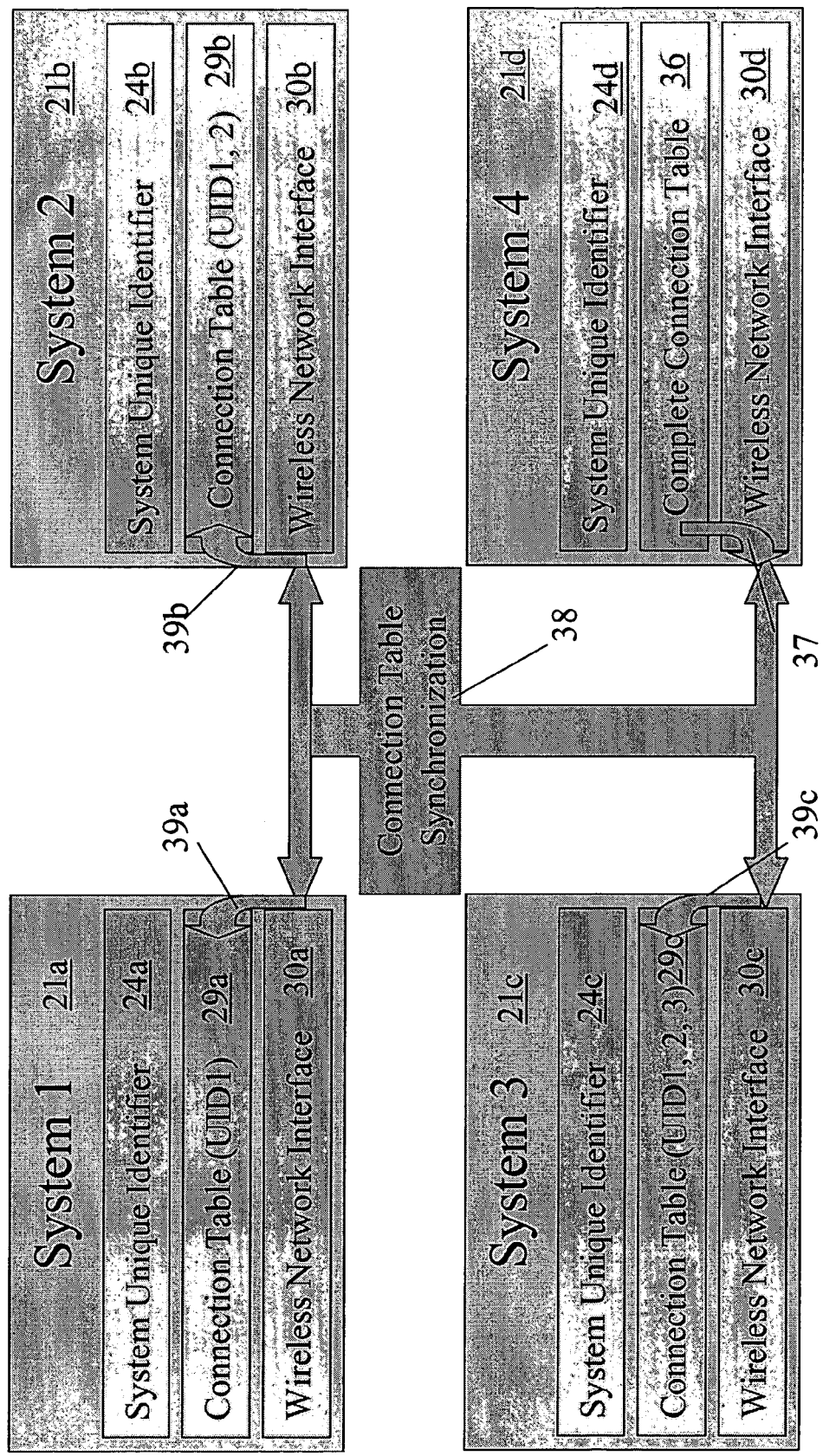
FIG. 3 shows an exemplary interaction between several wireless systems in which the systems exchange an updated connection table to become synchronized.

FIG. 3 illustrates diagrammatically an exemplary interaction between wireless systems 21a, 21b, 21c, and 21d in which the systems exchange complete connection table 36 in order to become synchronized. System 21a was the first system selected by the wand, and therefore system connection table 29a includes only system unique identifier 24a. System 21b was the second system selected by the wand, and therefore system connection table 29b includes system unique identifiers 24a and 24b. System 21c was the third system selected by the wand, and therefore system connection table 29c includes system unique identifiers 24a, 24b, and 24c. System 21d was the fourth and last system selected by the wand, and therefore complete connection table 36 includes system unique identifiers 24a, 24b, 24c, and 24d. During connection table synchronization 38, complete connection table 36 is distributed by communication 37 from system 21d. Communication 37 may be directed at all of the systems (i.e., 21a, 21b, and 21c) listed in complete connection table 36. Systems 21a, 21b, and 21c may all receive complete connection table 36 in the form of communications 39a, 39b, and 39c, respectively. These communications may take place over the network interface that the later-established network communicates through.

Figure 4:
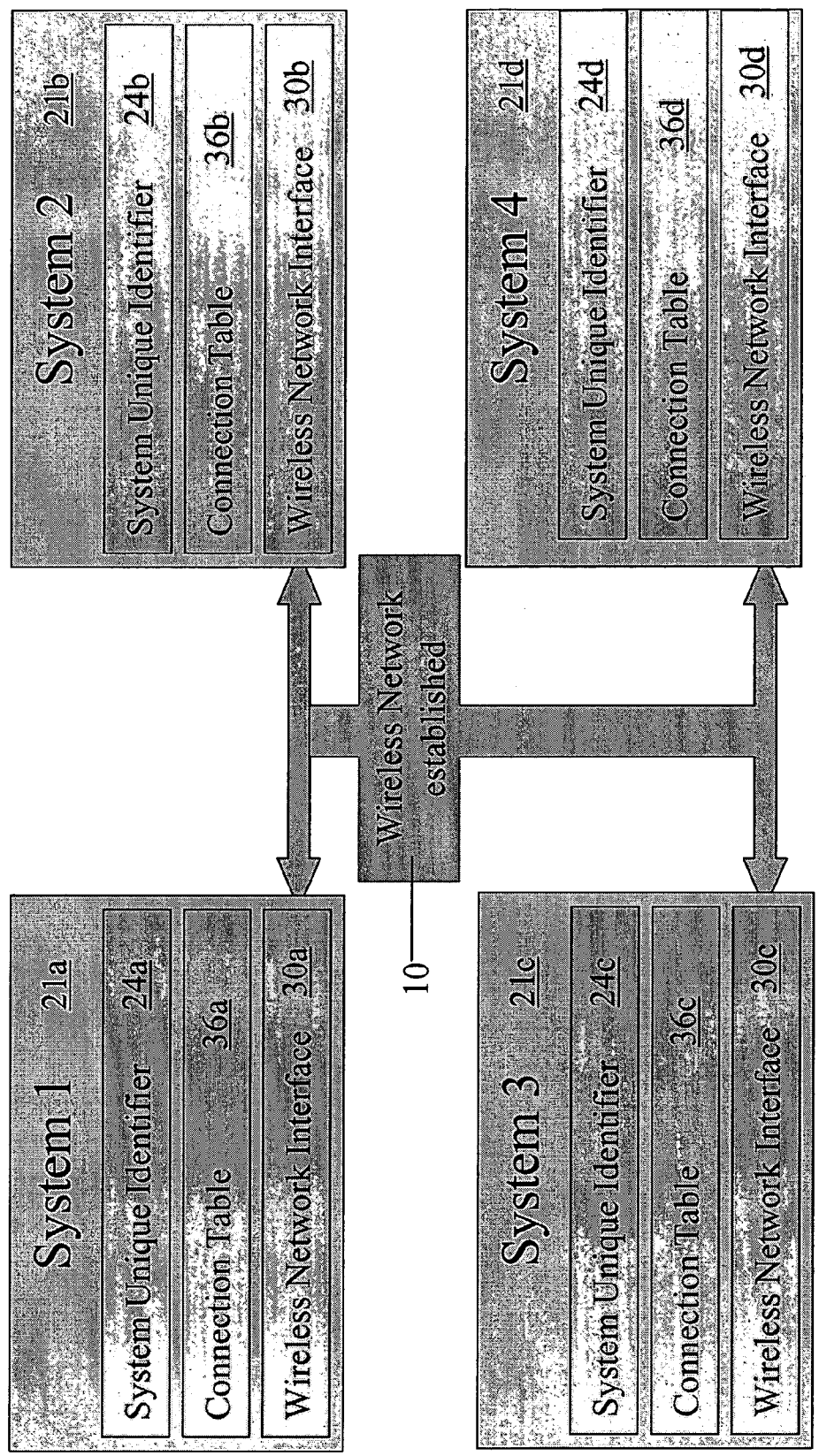
FIG. 4 shows an exemplary interaction between several wireless systems in which the systems are synchronized and the wireless network is operable.

FIG. 4 illustrates diagrammatically an exemplary interaction between wireless systems 21a, 21b, 21c, and 21d in which the systems are synchronized and wireless network 10 is configured and operating. Once complete connection table 36 is synchronized between wireless systems 21a, 21b, 21c, and 21d, network 10 may be configured, since all the information necessary for a wireless network is in each system. Each of wireless systems 21a, 21b, 21c, and 21d has respective system unique identifier 24a, 24b, 24c, and 24d (which should each be unique), a copy of complete connection table 36a, 36b, 36c, and 36d (which should all be identical), and wireless network interface 30a, 30b, 30c, and 30d (which use compatible settings). Each of these wireless network interfaces 30a, 30b, 30c, and 30d communicates with the other wireless network interfaces 30a, 30b, 30c, and 30d to create network 10.

Figures 5A, 5B, 5C:
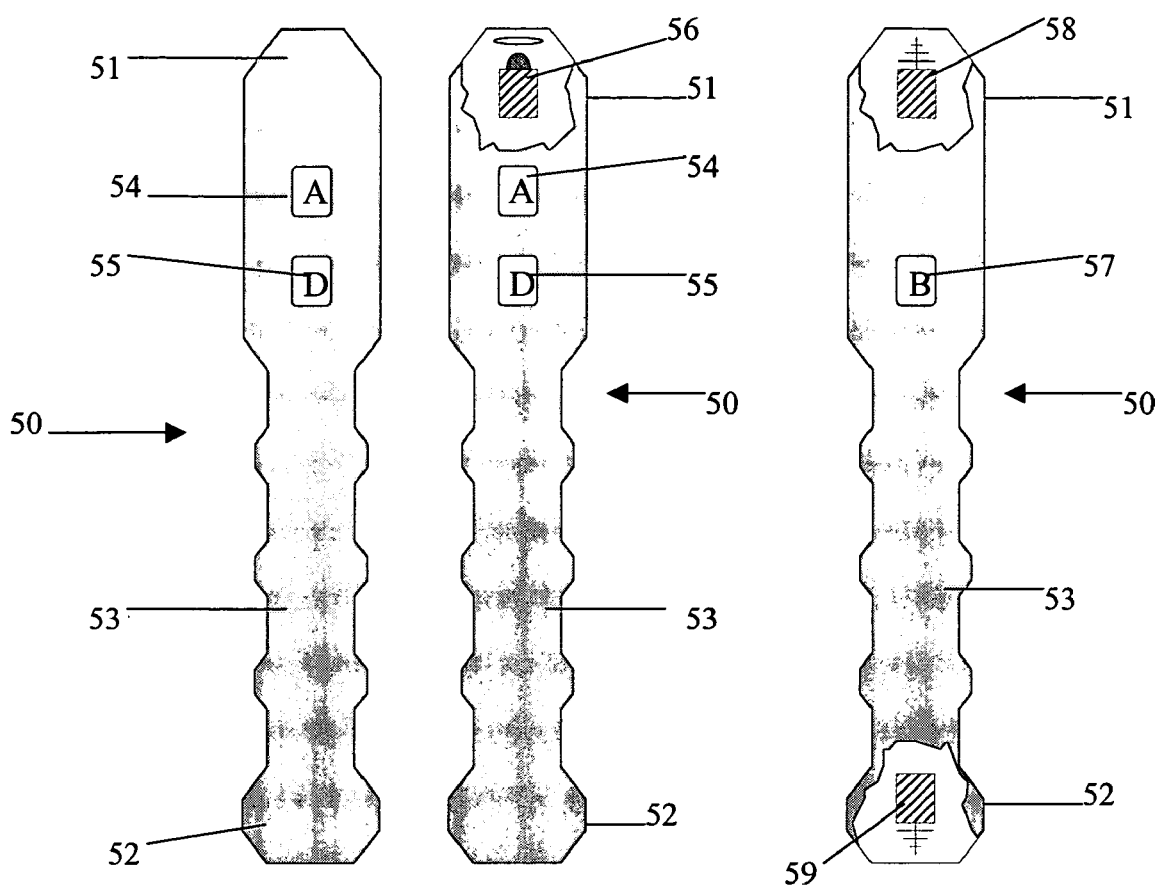
FIG. 5a shows an exemplary design of a wand showing the outside appearance with an add button to add systems to a network and a delete button to delete networked systems.
FIG. 5b shows an exemplary design of a wand with a cut-away view showing an IR transceiver.
FIG. 5c shows an exemplary design of a wand with forward/backward facing functionality with a cut-away view showing two RF transceivers.

FIG. 5a illustrates an exemplary design of wand 50 showing the outside appearance with add button 54 to add networked systems, and delete button 55 to delete networked systems. Wand 50 includes handle 53, forward end 51 and backward end 52. Activating add button 54 when forward end 51 of wand 50 is directed at a wireless device causes the transceiver to emit an interrogation signal causing the wireless device to transmit a signal including a unique identifier. The unique identifier may then be added to a connection table. Activating delete button 55 when forward end 51 of wand 50 is directed at a wireless device may cause the transceiver to emit an interrogation causing the wireless device to transmit a signal including a unique identifier. The unique identifier may then be removed from a connection table.

FIG. 5b illustrates an exemplary design of wand 50 with a cut-away view showing IR transceiver 56 situated in forward end 51. Also shown in wand 50 are add button 54, delete button 55, handle 53, and backward end 52. Activating add button 54 when forward end 51 of wand 50 is directed at a wireless device would cause IR transceiver 56 to emit an interrogation signal causing the wireless device to transmit a signal including a unique identifier. The unique identifier may then be added to a connection table. Activating delete button 55 when forward end 51 of wand 50 is directed at a wireless device may cause IR transceiver 56 to emit an interrogation signal causing the wireless device to transmit a signal including a unique identifier. The unique identifier may then be removed from the connection table.

FIG. 5c illustrates an exemplary design of wand 50 with forward/backward facing functionality with a cut-away view showing two RF transceivers. FIG. 5c shows a cut-away view of wand 50 showing add RF transceiver 58 situated in forward end 51 and delete RF transceiver 59 situated in backward end 52. Also shown in wand 50 are busy button 57 (also known as an actuate or actuation button) and handle 53. Activating busy button 57 of wand 50 causes both add RF transceiver 58 and delete RF transceiver 59 to be activated and to each emit an interrogation signal. The interrogation signal causes a wireless device receiving the signal to transmit a signal including a unique identifier. If forward end 51 were directed at a wireless device, then the signal emitted from the wireless device would be received by add RF transceiver 58. The unique identifier would then be added to a connection table. If backward end 52 were directed at a wireless device, then the signal emitted from the wireless device would be received by delete RF transceiver 59. The unique identifier would then be removed from the connection table.

The wand may be powered by an internal battery or by RF waves, which may be picked up from the wireless device at which the wand is pointed. The network characteristics may be independent of the powering of the wand. The remote powering may be done by using a light-to-electricity converter (i.e., equivalent to a solar cell). In this situation, the wand may work with infrared communication as well.

Inductive coupling can be used as well to perform the aforementioned tasks of adding or deleting wireless systems to or from a network. In this case, the wand can be powered by receiving inductively coupled energy from the wireless systems. FIG. 6a illustrates an exemplary block diagram of a wand with RF transceiver 62 and add button 54 and delete button 55. Processor 60 controls RF transceiver 62 to emit an interrogation signal after either add button 54 or delete button 55 is depressed. In response to the interrogation signal, a wireless device within range of RF transceiver 62 emits a signal including a unique identifier. RF transceiver 62 receives the signal including the unique identifier from the wireless device and transmits the signal to processor 60. Processor 60 may retrieve the current connection table from memory 61 and may add the unique identifier to the connection table if add button 54 was depressed and may delete the unique identifier from the connection table if delete button 55 was depressed. Then processor 60 may communicate the updated connection table to RF transceiver 62 to transmit the updated connection table to the wireless device. Processor 60 may send the updated connection table to memory 61 to overwrite the previously stored connection table.

FIG. 6*b* illustrates an exemplary block diagram of a wand with forward/backward facing functionality using two RF transceivers (63, 64) and an optional actuate (also known as a busy) button 57. Processor 60 may control "add RF transceiver" 63 and "delete RF transceiver" 64 to emit an interrogation signal when actuate button 57 is depressed. In response to the interrogation signal, a wireless device within range of "add RF transceiver" 63 or "delete RF transceiver" 64 may emit a signal including a unique identifier. If either of "add RF transceiver" 63 or "delete RF transceiver" 64 receives the unique identifier from the wireless device, "add RF transceiver" 63 or "delete RF transceiver" 64 may transmit it to processor 60. Processor 60 may retrieve the current connection table from memory 61 and adds the unique identifier to the connection table if the unique identifier was received by "add RF transceiver" 63 and deletes the unique identifier from the connection table if the unique identifier was received by "delete RF transceiver" 64. Then processor 60 communicates the updated connection table to the one of "add RF transceiver" 63 and "delete RF transceiver" 64 that received the unique identifier to transmit the updated connection table to the wireless device. Alternatively, processor 60 may communicate the updated connection table to both "add RF transceiver" 63 and "delete RF transceiver" 64 to both transmit the updated connection table. Processor 60 may send the updated connection table to memory 61 to overwrite the previously stored connection table.

Figures 6C, 6D:
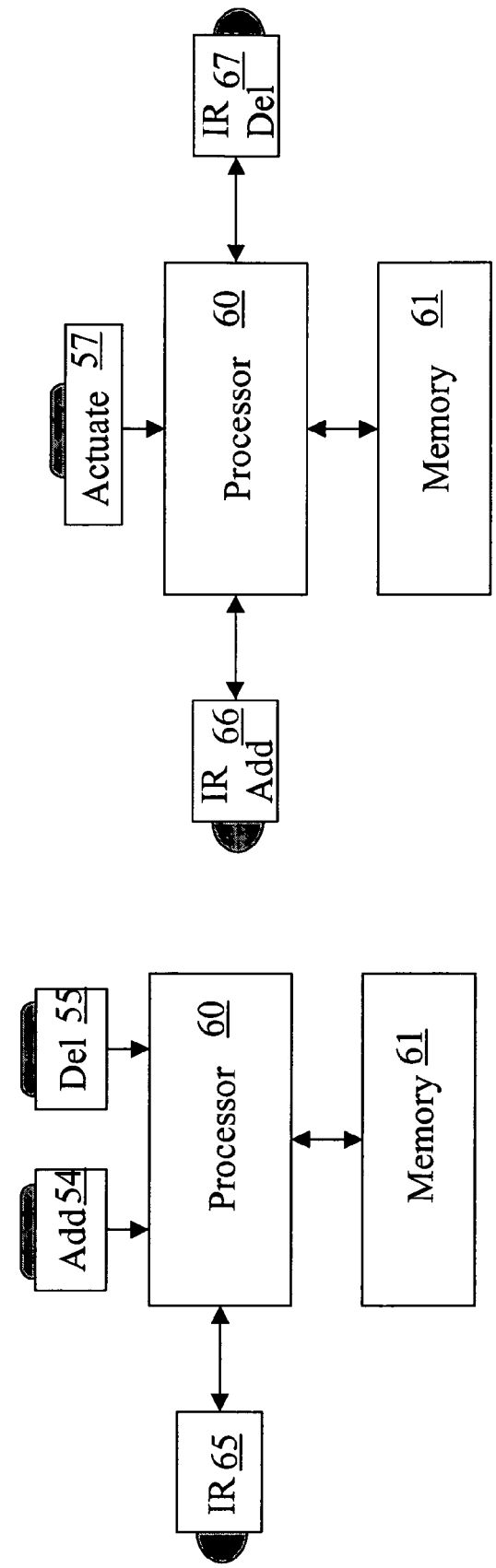
FIG. 6c shows an exemplary block diagram of a wand with one IR transceiver and an add button and a delete button.
FIG. 6d shows an exemplary block diagram of a wand with forward/backward facing functionality using two IR transceivers and an optional actuation button.

FIG. 6*c* illustrates an exemplary block diagram of a wand with IR transceiver 65 and add button 54 and delete button 55. Processor 60 controls IR transceiver 65 to emit an interrogation signal after either add button 54 or delete button 55 is depressed. In response to the interrogation signal, a wireless device within range of IR transceiver 65 may emit a signal including a unique identifier. IR transceiver 65 receives the unique identifier from the wireless device and transmits it to processor 60. Processor 60 retrieves the current connection table from memory 61 and adds the unique identifier to the connection table if add button 54 was depressed and deletes the unique identifier from the connection table if delete button 55 was depressed. Then processor 60 communicates the updated connection table to IR transceiver 65 to transmit the updated connection table to the wireless device. Processor 60 also sends the updated connection table to memory 61 to overwrite the previously stored connection table.

FIG. 6*d* illustrates an exemplary block diagram of a wand with forward/backward facing functionality using two IR transceivers (66, 67) and an optional actuate (also known as a busy) button 57. Processor 60 controls "add IR transceiver" 66 and "delete IR transceiver" 67 to emit an interrogation signal when actuate button 57 is depressed. In response to the interrogation signal, a wireless device within range of "add IR transceiver" 66 or "delete IR transceiver" 67 emits a signal including a unique identifier. If either of "add IR transceiver" 66 or "delete IR transceiver" 67 receives the signal including the unique identifier from the wireless device, "add IR transceiver" 66 or "delete IR transceiver" 67 transmits it to processor 60. Processor 60 retrieves the current connection table from memory 61 and adds the unique identifier to the connection table if the unique identifier was received by "add IR transceiver" 66 and deletes the unique identifier from the connection table if the unique identifier was received by "delete IR transceiver" 67. Then processor 60 communicates the updated connection table to the one of "add IR transceiver" 66 and "delete IR transceiver" 67 that received the unique identifier to transmit the updated connection table to the wireless device. Alternatively, processor 60 may communicate the updated connection table to both "add IR transceiver" 66 and "delete IR transceiver" 67 to both transmit the updated connection table. Processor 60 also may send the updated connection table to memory 61 to overwrite the previously stored connection table.

The wand may not require a memory. For instance, if the wand has a unique identifier (UID), for instance a serial number, the wireless device may maintain the connection table and this connection table may be identified just by the UID. The UID of the wand may also contain or function as a type of cryptographic key to encode the connection table while it is transmitted over the ordinary network that the system uses later on. For example, the wand may be pointed towards a device. The device may pick up the UID and use it to encrypt a message (e.g., the connection table with the UID of the device included) and send it out. All the other wireless systems may receive the connection table and store it. The next device that the wand is pointed at may be able to encrypt the message (using the wand's UID-key), may add its own UID, and may send a new message (i.e., a new connection table). The first device may be able to decrypt the new, encrypted connection table and may update its own connection table stored in memory. Any other device may receive the new, encrypted connection table and, since the other devices do not have the UID-key from the wand, and have not yet therefore been selected for inclusion in the network, the other devices may just store the encrypted connection table and wait. The next device selected by the wand for inclusion in the network will again be able to decrypt the message as soon as it gets the UID-key from the wand. This process may continue until all of the devices that are to be part of the network have been selected by the wand and have decrypted the most complete and most recent connection table.

Figure 7:
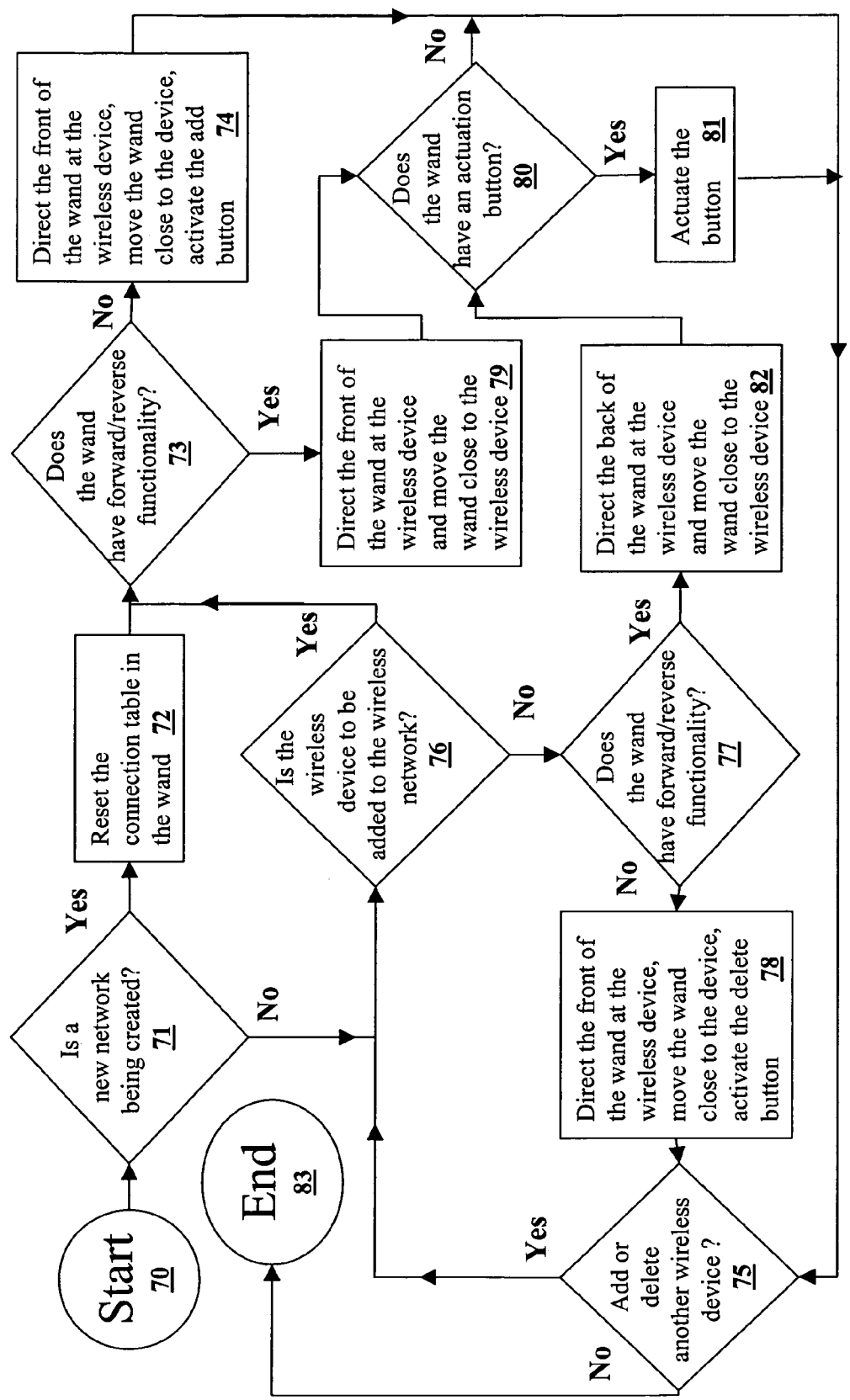
FIG. 7 shows a system flowchart illustrating an exemplary method according to the present invention.

FIG. 7 is a flowchart illustrating an exemplary method according to the present invention, which is performed by an individual using a process or arrangement in the wand or in a wireless device. The system flow starts in start circle 70 and proceeds to question 71, which asks whether a new network is being created. If the answer to question 71 is affirmative, the system flow proceeds to action 72, which indicates to reset the connection table in the wand. From action 72, the system flow proceeds to question 73, which asks whether the wand has forward/reverse functionality. If the answer to question 73 is negative, the system flow proceeds to action 74, which indicates to direct the front of the wand at the wireless device, move the wand close to the device, and activate the add button. From action 74, the system flow proceeds to question 75, which asks whether another wireless device will be added or deleted.

If the answer to question 75 is affirmative, the system flow proceeds to question 76, which asks whether the wireless device is to be added to the wireless network. If the answer to question 71 is negative, the system flow also proceeds to question 76. If the answer to question 76 is affirmative, the system flow proceeds to question 73. If the answer to question 76 is negative, then a wireless device is to be deleted from the network. In this situation, the system flow proceeds to question 77, which asks whether the wand has forward/reverse functionality. If the answer to question 77 is negative, the system flow proceeds to action 78, which indicates to direct the front of the wand at the wireless device, move the wand close to the device, and activate the delete button. From action 78, the system flow proceeds to question 75.

If the response to question 73 is affirmative, the system flow proceeds to action 79, which indicates to direct the front of the wand at the wireless device and move the wand close to the wireless device. From action 79, the system flow proceeds to question 80, which asks whether the wand has an actuation button. If the response to question 80 is negative, then the wand has an always-on functionality. In this situation, the wand is always transmitting, or always transmitting when in close proximity to a wireless device. The system flow then proceeds to question 75. If the response to question 80 if affirmative, the system flow proceeds to action 81, which indicates to actuate the button.

If the response to question 77 is affirmative, the system flow proceeds to action 82, which indicates to direct the back of the wand at the wireless device and move the wand close to the wireless device. From action 82, the system flow proceeds to question 80. If the response to question 75 is negative, the system flow proceeds to end circle 83.

The arrangement for exchanging information with the wand and each individual system may be an infrared-based connection, a short-range RF connection, a short-range inductive coupling (magnetic communication), or any other appropriate method of communicating over short distances. Short-range RF connections may be used in RFID tags. RFID tags are electronic components that may include a unique identifier (UID) coupled with a radio transmitter. RFID tags may be passive devices (i.e. they are powered wirelessly from their counterpart when they are probed). This wireless powering scheme may be designed so that it provides enough energy for the RFID tag to respond, which may enable RFID tags to be manufactured very small and inexpensively. RFID tags may be designed to have a very short distance connectivity range (for instance, a few centimeters), which may make them appropriate for pinpoint applications.

In an exemplary method of the present invention, setting up a new network may involve pointing the electronic device (the wand) towards the systems. The wand may exchange information with the system (for example, a unique identifier). The information may be stored in the wand temporarily and may be exchanged with the next system at which the wand is pointed. The next system may send its own information (for example, a unique identifier) to the wand. Then the second system may retrieve the information stored from the first system (e.g., its unique identifier) and configure its wireless network interface accordingly. When the wand is pointed to a third system, the third system first sends its own information, and then retrieves the information from the first two systems. The information from the first two systems may then be used to configure the third system's wireless network interface accordingly.

The process may continue until the wand has pointed towards all of the systems. Then the last system may have the information about all the other systems in the network and may start connecting to them. In the following synchronization process, the information, which may be called a connection table, may be synchronized with all the other systems defined in the connection table. After the synchronization process, all systems have information about every other system authorized in the network and the network connections may be established.

A button on the wand may be pressed when pointing it to a particular system to initiate the information exchange with the destined device. This may ensure that only desired systems are addressed, otherwise other systems, which are in the wand's reach, may inadvertently be included.

There are a number of methods to permanently disconnect systems from an existing network. A separate button on the wand may be used to disconnect systems (for example, a delete button). Alternatively or additionally, the wand may be used in a different manner to disconnect systems. For example, when adding a system, the wand may be held in a forward position (which may be defined by an arrow on the wand or its shape). When deleting a connection, a backward end of the wand may be pointed towards the system.

During set-up of the wireless network, pressing the add button on the wand may initiate the retrieval of the system's UID. The wand may then add the system's UID to the connection table. Pressing the delete button during a disconnect procedure may result in the UID that is received from the system being removed from the connection table. After synchronizing the connection table, the UID of the deleted system may not continue to be part of the connection table and therefore the system may be disregarded.

In this exemplary embodiment, two different transmitters may be in the wand. The forward-facing transmitter may initiate an add command, while the backward-facing transmitter may initiate the delete command.

Adding systems to an existing network may be performed in a similar manner to the action of setting up a network. Before adding a new system, the wand may be pointed towards any existing member of the network in order to obtain the current connection table information. When adding a new system using the add button, the whole connection table information may be transferred to the new system, which may then initiate synchronization in a similar manner to that described in conjunction with the initial setting up of a network.

Using a forward/backward wand, the network update may be performed in a similar manner. First the forward side may be pointed to an existing member of the network, and then the forward side may be pointed towards the system, which is to be added to the network.

Security issues may arise in some exemplary embodiments of the present invention. In one exemplary implementation, the connection table may be synchronized every time a new system is added. The synchronization may be accomplished by using the wireless connection that the network will use later on. The first system does not know of any other members of the network, and therefore does not talk to any other system. The second system has the UID of the first system and therefore may connect with the first system and synchronize the connection table with the first system. The third system has the UIDs of the previous two systems and therefore may expand the network by including itself.

However, this approach may enable a malicious system to include itself in the network by waiting for the last connection table update and then adding its UID to the connection table and then synchronizing again. Unauthorized entry into the network may be prevented if, during the information exchange between the systems and the wand, encryption mechanisms are used. An exemplary method may be that the wand generates a pair of software keys, which are exchanged between (and only between) the systems that the wand is pointed towards. Using those software keys, the connection table synchronization (that follows the addition by the wand of the last member of the network) may be scrambled so that outside systems may not penetrate the network. These software keys may also include network parameters such as channel number, frequency hopping, and/or switching sequences to further enhance security.

The wand may be provided with a reset functionality. If the wand is used to set-up more than one network, reset functionality may be necessary. For end-user home A/V (audio-visual) systems, reset functionality may not be necessary if the wand functionality is integrated into a system remote control.

While the present invention has been described in connection with the foregoing representative embodiment, it should be readily apparent to those of ordinary skill in the art that the representative embodiments and methods are exemplary in nature and are not to be construed as limiting the scope of protection for the present invention as claimed.

What is claimed is:

1. A method for configuring a wireless network, comprising:
    pointing a first end of a network configuration device at a wireless device;
    selecting the wireless device by the network configuration device, wherein the selecting by the network configuration device includes actuating a first button of the network configuration device;
    pointing a second end of the network configuration device at the wireless device, the second end opposite the first end; and
    actuating the first button to delete the wireless device from the wireless network.

2. A method for configuring a wireless network, comprising:
    pointing a first end of a network configuration device at a wireless device;
    selecting the wireless device by the network configuration device, wherein the selecting by the network configuration device includes actuating a first button of the network configuration device;
    pointing the first end of the network configuration device at a further wireless device;
    actuating the first button to add the further wireless device to the wireless network;
    pointing a second end of the network configuration device at the further wireless device, the second end opposite the first end; and
    actuating the first button to delete the further wireless device from the wireless network.

* * * * *